(12) United States Patent
Firsoff et al.

(10) Patent No.: US 9,205,521 B2
(45) Date of Patent: Dec. 8, 2015

(54) RESILIENT RING-SHAPED CLIP INSTALLATION SYSTEM AND HANDLING APPARATUS THEREFOR

(71) Applicant: HONDA MOTOR CO., LTD., Tokyo (JP)

(72) Inventors: Claudio Firsoff, Orangeville (CA); Wayne Toner, Barrie (CA); Paul Fraser, Barrie (CA)

(73) Assignee: HONDA MOTOR CO., LTD., Tokyo (JP)

( * ) Notice: Subject to any disclaimer, the term of this patent is extended or adjusted under 35 U.S.C. 154(b) by 181 days.

(21) Appl. No.: 14/016,735

(22) Filed: Sep. 3, 2013

(65) Prior Publication Data

US 2015/0059147 A1 Mar. 5, 2015

(51) Int. Cl.
*B23P 19/08* (2006.01)

(52) U.S. Cl.
CPC .................................. *B23P 19/084* (2013.01)

(58) Field of Classification Search
CPC ................... Y10T 29/49778; Y10T 29/49947; Y10T 29/49826; B23P 19/084; B23Q 5/26; B23Q 2705/068
USPC ............ 29/244, 252, 253, 261, 222, 229, 235
See application file for complete search history.

(56) References Cited

U.S. PATENT DOCUMENTS

| | | | |
|---|---|---|---|
| 1,740,590 A | 12/1929 | Hartman | |
| 3,134,168 A | 5/1964 | Erdmann | |
| 3,138,854 A * | 6/1964 | Erdmann | 29/809 |
| 3,605,239 A * | 9/1971 | Eschholz | 29/717 |
| 4,325,172 A | 4/1982 | Holdaway | |
| 4,610,834 A * | 9/1986 | Baron et al. | 264/249 |
| 5,315,746 A * | 5/1994 | Machino et al. | 29/451 |
| 5,343,607 A | 9/1994 | Southerland, Jr. et al. | |
| 5,956,830 A | 9/1999 | Imbus et al. | |
| 6,112,411 A | 9/2000 | Rutter | |
| 6,173,605 B1 | 1/2001 | Rankin | |
| 6,494,516 B1 | 12/2002 | Bertini | |
| 6,507,985 B1 | 1/2003 | Loughlin et al. | |
| 6,722,011 B1 * | 4/2004 | Bacon | 29/451 |
| 6,757,950 B2 * | 7/2004 | Malone | 29/235 |
| 6,789,313 B2 | 9/2004 | Hendricks | |
| 7,210,219 B2 | 5/2007 | Thal | |
| 7,827,888 B2 | 11/2010 | Tatsumi | |
| 8,267,593 B2 | 9/2012 | Suma | |
| 8,505,176 B2 | 8/2013 | Ueda et al. | |
| 8,671,533 B2 * | 3/2014 | Haag et al. | 29/235 |
| 8,776,347 B2 | 7/2014 | Virkler et al. | |
| 2004/0093728 A1 | 5/2004 | Hendricks | |

(Continued)

FOREIGN PATENT DOCUMENTS

| | | |
|---|---|---|
| FR | 2595283 A1 | 9/1987 |
| FR | 2649349 A1 | 1/1991 |
| FR | 2862247 A1 | 5/2005 |
| JP | 2004255501 | 9/2004 |
| JP | 2009083035 | 4/2009 |

*Primary Examiner* — David Bryant
*Assistant Examiner* — Lawrence Averick
(74) *Attorney, Agent, or Firm* — Standley Law Group LLP

(57) ABSTRACT

Described are various embodiments of a resilient ring-shaped clip installation system and method, as well as handling apparatus associated therewith. In one embodiment, the apparatus comprises gripping fingers circumferentially disposed and radially actuated to grip and radially compress the clip, and stripping rods axially actuated to axially engage and strip the compressed clip from the gripping fingers.

18 Claims, 11 Drawing Sheets

(56) References Cited

U.S. PATENT DOCUMENTS

| | | |
|---|---|---|
| 2005/0125982 A1 | 6/2005 | Wambold et al. |
| 2007/0124920 A1 | 6/2007 | Kim |
| 2007/0231115 A1 | 10/2007 | Tatsumi |
| 2008/0295331 A1 | 12/2008 | Stemer |
| 2010/0192345 A1 | 8/2010 | Monyak et al. |
| 2011/0069922 A1 | 3/2011 | Ravenna et al. |
| 2012/0324687 A1* | 12/2012 | Miyajima et al. ............... 29/235 |

* cited by examiner

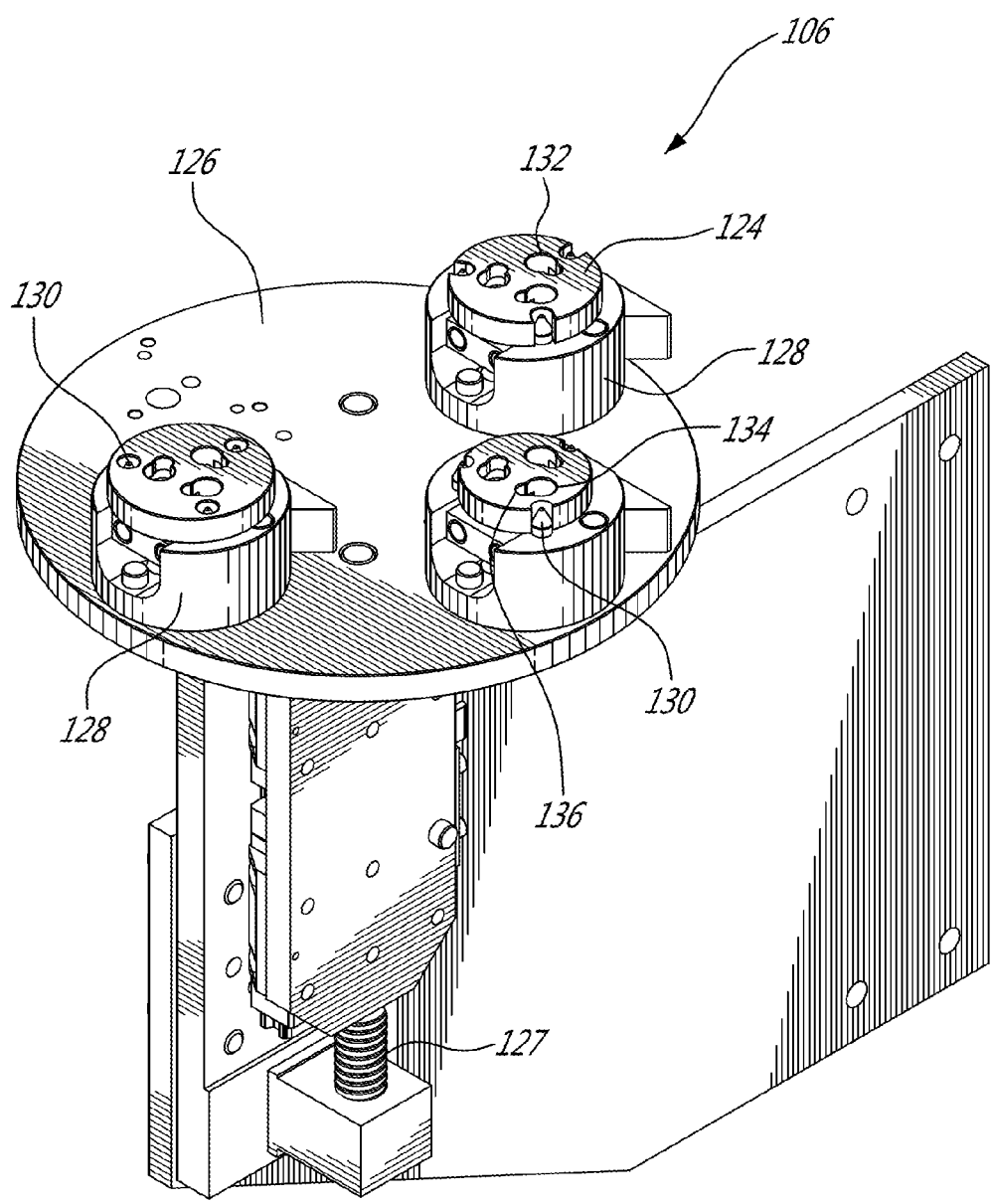

RESILIENT RING-SHAPED CLIP INSTALLATION SYSTEM AND HANDLING APPARATUS THEREFOR

FIELD OF THE DISCLOSURE

The present disclosure relates to clips, and installation methods and apparatus therefor, and in particular, to a resilient ring-shaped clip installation system and handling apparatus therefor.

BACKGROUND

C-clips (also known as circlips or snap rings) are generally known in the art to consist of an open-ring or c-shaped clip used, for example, to engage an annular groove circumferentially formed within a bore or on the surface of a shaft, or the like. Such installation generally serves to restrict axial movement of parts abutting the clip without impeding rotation, for example.

Various tools have been developed to facilitate installation of c-clips on a shaft. Installation of such clips for engagement with a corresponding recess or groove formed within and circumscribing a bore, however, can prove more difficult. Some tools and techniques have nonetheless been proposed to facilitate such installations, whereby the clip is generally introduced within the bore by various means and ultimately released for engagement with the recess.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

There remains a need for a resilient ring-shaped clip installation system and handling apparatus therefor, that overcome some of the drawbacks of known technologies, or at least, provides the public with a useful alternative. Some aspects of the below described embodiments provide such a system and apparatus.

In accordance with one aspect, there is provided an apparatus for delivering a resilient ring-shaped clip to a clip receiving groove circumferentially defined within a bore. The apparatus comprises two or more gripping fingers operable to circumferentially grip and radially compress the clip for alignment with the bore, and two or more stripping rods operable to axially extend from the apparatus in alignment with the clip when compressed and apply an axial stripping force thereto that strips the compressed clip from the fingers and delivers the clip into the bore to rest within the groove.

In accordance with another aspect, there is provided a clip delivery method for delivering a resilient ring-shaped clip to a clip receiving groove circumferentially defined within a bore. The method comprises: circumferentially gripping the clip via two or more gripping fingers; radially compressing the clip via the two or more gripping fingers for alignment with the bore; and applying an axial stripping force on the radially compressed clip via stripping rods at least partially nested within the fingers so to extend therefrom and thus axially engage the clip under the axial stripping force. The stripping rods deliver the compressed clip into the bore under the axial stripping force to release within the groove.

In accordance with another aspect, there is provided a circlip handling apparatus. The apparatus comprises gripping fingers circumferentially disposed and radially actuated to grip and radially compress the circlip, and stripping rods axially actuated to axially engage and strip the compressed circlip from the gripping fingers.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 10 is a perspective view of a disk stopper selection station of the system of FIG. 1.

DETAILED DESCRIPTION

The systems and methods described herein provide, in accordance with different examples, a resilient ring-shaped clip installation system, and handling apparatus therefor. For instance, in some aspects, the below described system and apparatus can automate the installation of a retaining ring used to hold a wheel bearing in place after it has been pressed into a wheel hub casting. It has the ability to accommodate a variety of different retaining ring sizes which may be relevant when producing multiple models of wheel bearing assemblies.

As will be appreciated by the skilled artisan, while the below examples are cast within this context, the system and apparatus described herein may readily be applied for the installation of similar clips (e.g. commonly known as circlips, C-clips, snap rings or more generically resilient ring-shaped clips, all interchangeably and commonly referred to hereinafter as clip for simplicity) to other components, for example in securing against axial displacement of such components once inserted, pressed or otherwise introduced within a corresponding bore.

These and other applications will be described in greater detail below, in a non-restrictive manner, with reference to the below description of exemplary embodiments.

Figure 1:
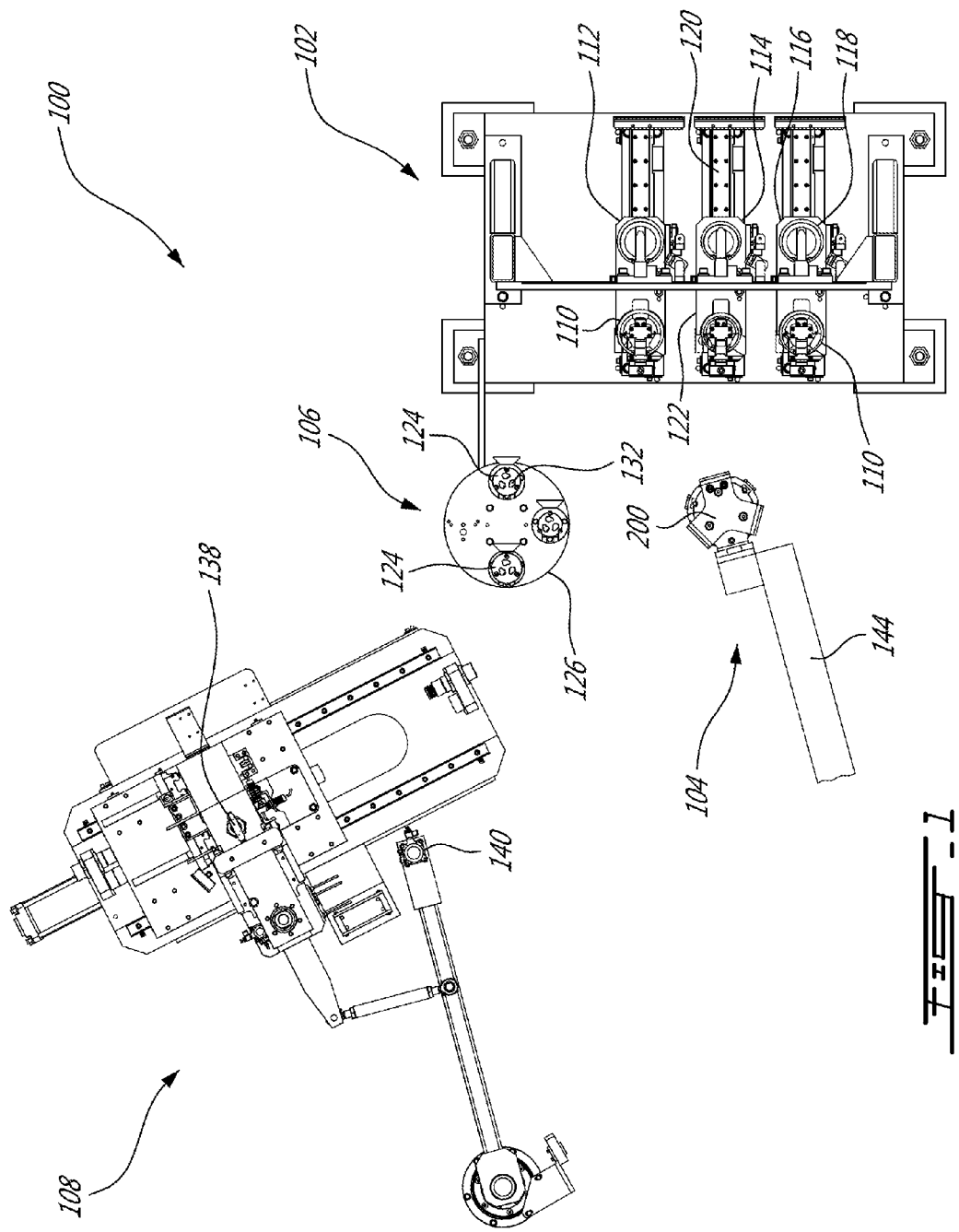
FIG. 1 is a top view of a resilient ring-shaped clip installation system, in accordance with one embodiment of the invention.

With reference now to FIG. 1, and in accordance with one embodiment, a resilient ring-shaped clip installation system, generally referred to using the numeral 100, will now be described. The system 100 generally comprises a clip dispensing station 102, a clip handling apparatus 104, a disc stopper selection station 106 and a wheel bearing press station 108.

The clip dispensing station 102 is configured in this example to dispense clips 110 in three different sizes via dispensing magazines 112, 114 and 116, respectively, for assembly within the context of wheel bearing/hub assemblies of different sizes (e.g. for different vehicle types and/or models). Each dispenser generally comprises a clip stacking column 118 mounted and shaped to dispense a single clip at a bottom opening thereof. A pusher arm or like mechanism 120 is provided to interact with the dispensed clip at the bottom opening of the column 118 and push the clip forward on selection tray 122 to be picked up by the handler 104. One or more sensors (not shown) can be provided to detect clip removal from the tray and thus initiate the pusher mechanism to dispense successive clips.

To provide the stripping action, a stripping assembly is resiliently coupled to the jig body 210 by way of a load receiving structure shown generally at 225, which includes spring-loaded shoulder bolts 226. Shoulder bolts 226 are secured through base plate 220, which forms part of the stripping assembly, such that the base plate 220, and thus the remainder of the stripping assembly directly or indirectly coupled thereto, resiliently hovers over a base portion 228 of the jig body 210. Three axial arms 230 are fixedly coupled at a periphery of the base plate 220 to axially extend along the jig body 210 and terminate into respective arcuate plates 232 that extend circumferentially between the fingers 202. Respective horizontal couplers 234 slidingly engage radially oblong recesses 236 defined within opposed circumferential extremities of adjacent plates 232, as each coupler 234 extends through a respective axially oblong channel 238 defined within each finger 202. Fixedly coupled to these couplers 234 are the stripping rods 218, which extend axially within each finger 202 and ultimately provide a stripping action through fingertip apertures 222.

In this particular example, and with added reference to FIGS. 10 and 11, the disc selection station 106 comprises a spring-loaded selection tray 126 (e.g. spring mount 127 provided to minimize or avoid impact-related damage and/or wear on the handling apparatus 104 during disc selection) having mounted thereon respective magnetic disc holders 128 each having respective pointed positioning pegs 130 to guide and secure an orientation of the disc thereon for selection by the handler 104. A dowel (not shown) uniquely located on each holder 128 for each disc must be cooperatively aligned with a corresponding hole (see hole 205 of FIGS. 9 and 11) formed within the disc, thus preventing a disc from being placed on the wrong holder 128. In this embodiment, the trapezium shape of each holder 128 is provide to facilitate a robot teaching process, whereby fingers 202 can be descended on the holder 128 such that one of the fingers abuts on one side of the trapezium-shaped holder 128, and then rotated until an adjacent finger 202 abuts an opposite side of the trapezium-shaped holder 128, which rotation corresponds with a rotation required to lock/unlock the disc 124 on the jig 200.

Figure 8:
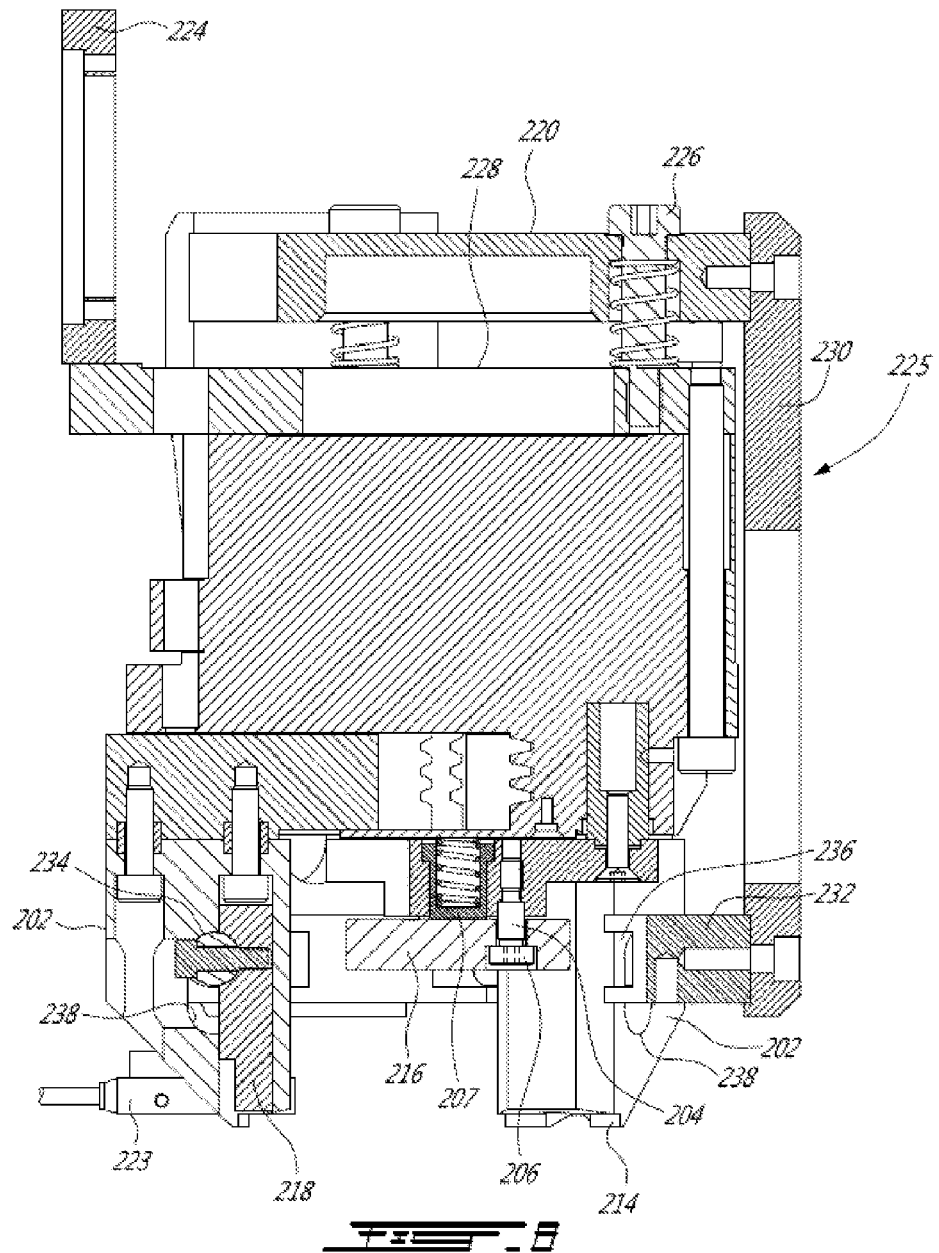
FIG. 8 is a vertical cross sectional view of the resilient ring-shaped clip handling apparatus of FIG. 7 taken along line 8-8 thereof.

In this embodiment, each disc 124 includes three seated keyhole apertures 132 shaped and positioned to interact with three corresponding coupling bolts (i.e. see coupling bolt 204 of FIG. 8, such as a socket head shoulder bolt in this example) which are inserted through the larger lobe 134 of the aperture 132 and then revolved to axially lock the head 206 of the bolt 204 within the smaller seated lobe 136 of the aperture 132. In this particular example, and again as best seen in FIG. 8, the disk 124 is set against a spring-biased piston 207 so as to impart an axial pressure on the disk 124 against the bolt head 206 to secure it into position during use. Other disc selection, coupling and/or locking techniques may also be considered, as will be readily appreciated by the skilled artisan. Each holder 128 may further include one or more sensors (not shown) to track selection and return of each disc from and to the holder 128.

Figure 11C:
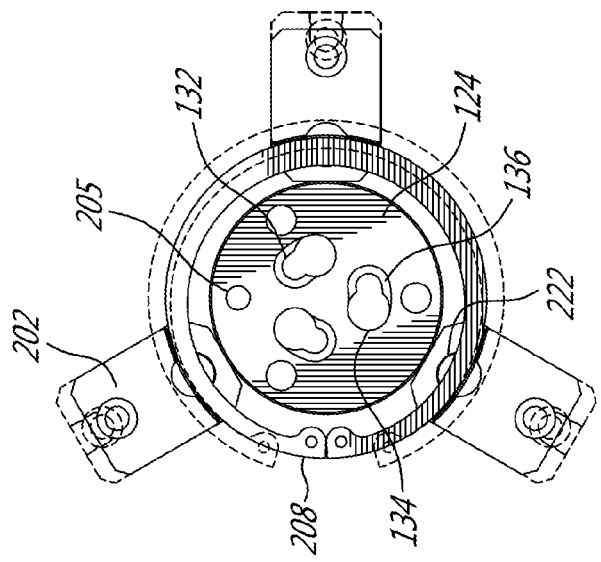
FIGS. 11A to 11C are top views of respective disk stoppers illustratively mounted relative to the fingers of the resilient ring-shaped clip handling apparatus of FIG. 2 for limiting travel thereof for different selectable clip sizes; in accordance with one embodiment of the invention.
Figure 11B:
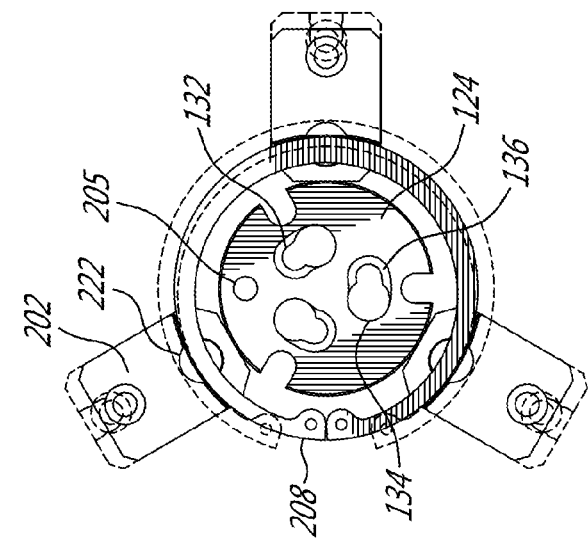
Figure 11A:
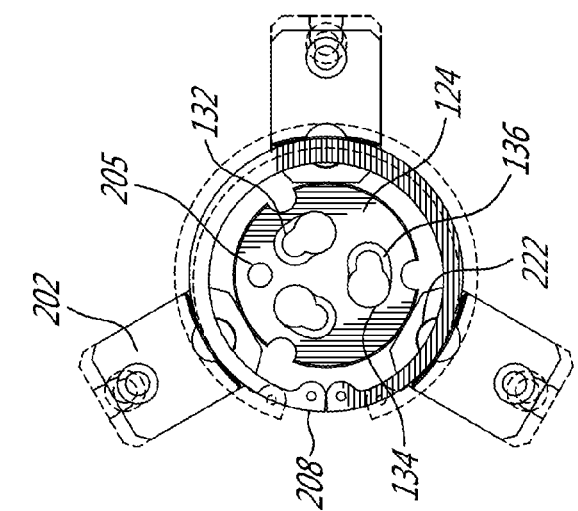

FIGS. 11A to 11C illustrate how clips 208 of different sizes are held and compressed by fingers 202 to a designated clip compression setting by virtue of differently sized stoppers 124, whereby an inner surface of the fingers 202 abut against the stopper once the designated setting is reached.

Figure 5:
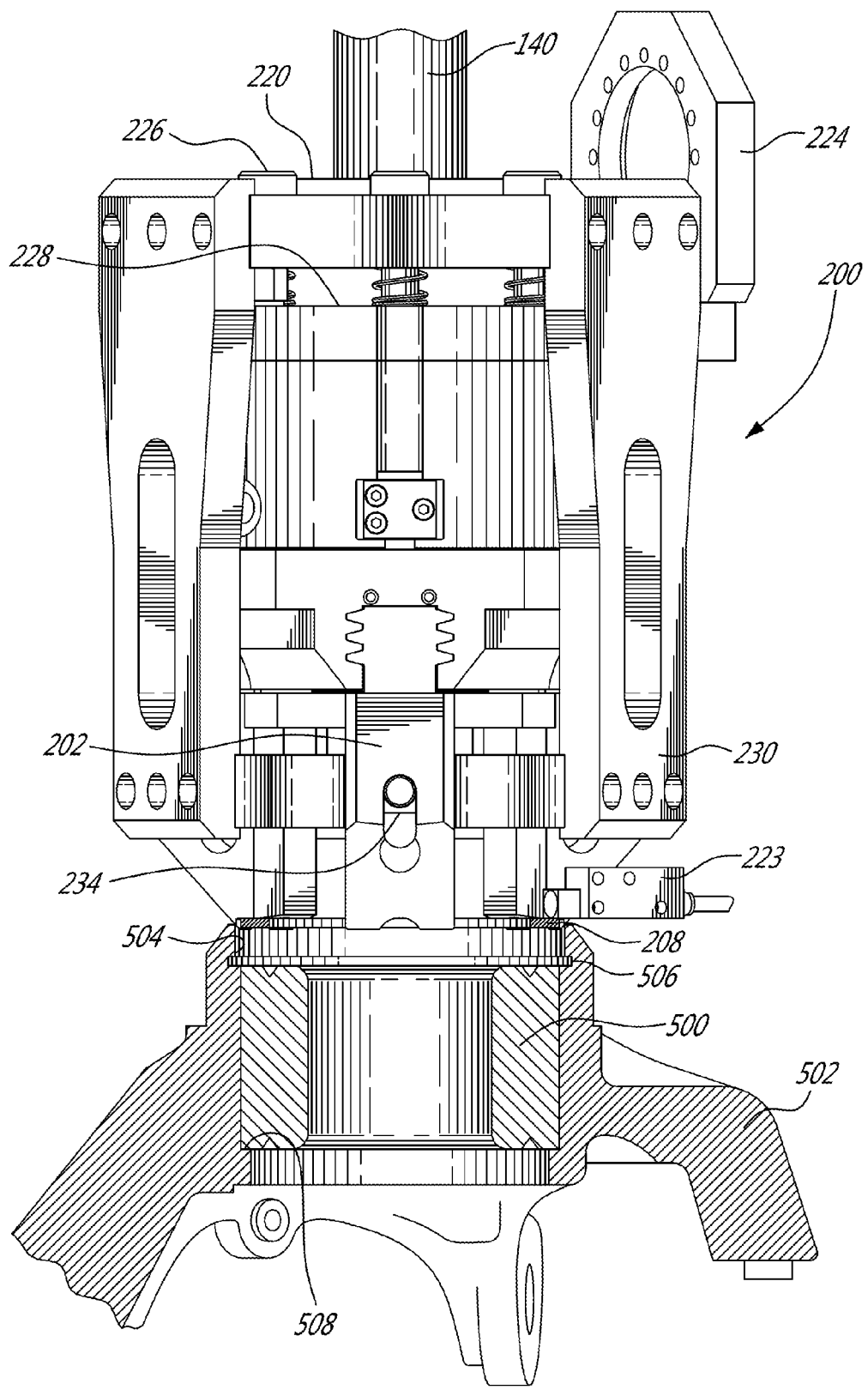
FIG. 5 is a side view of the resilient ring-shaped clip handling apparatus of FIG. 4 operatively aligned with an external press cylinder and showing a cross section of a wheel bearing assembly in which the ring is to be installed.

With particular reference to FIGS. 1 and 5, the press station 108 generally comprises a bearing press mechanism 138 configured to receive, either manually or automatically conveyed thereto (e.g. via an indexed rotary conveyor system), a wheel bearing and hub/knuckle casting (i.e. see bearing 500 and casting 502 of FIG. 5) to be pressed one into the other by the mechanism 138 using standard methods. An external cylinder press 140, operatively disposed to revolve within proximity of the press mechanism 138, is also provided, as will be discussed in greater detail below with reference to FIGS. 5 and 6, to interact with the handling jig 200 to strip a given clip 208 retained thereby and consequently result in the installation of the clip 208 in axially securing the wheel bearing 502 within the hub 500.

Still with reference to FIG. 1, the handling apparatus 104 generally comprises a clip handling jig 200 operatively mounted to a robotic arm 144 and thus configured to move the handling jig 200 between system stations. For instance, the handling jig 200 may first be aligned with a selected disc stopper 124 and operated to select and mount the selected stopper thereto, then repeatedly moved over to a corresponding clip dispenser at station 102 to grab a clip 110 and bring it to press station 108 where it is aligned in its compressed state over a designated wheel bearing/hub assembly (not shown) and stripped into place via press cylinder 140. The jig 200 is then returned to the dispenser station 102 for subsequent clip installations, until a new disc size is required from the selection station 106.

Figure 2:
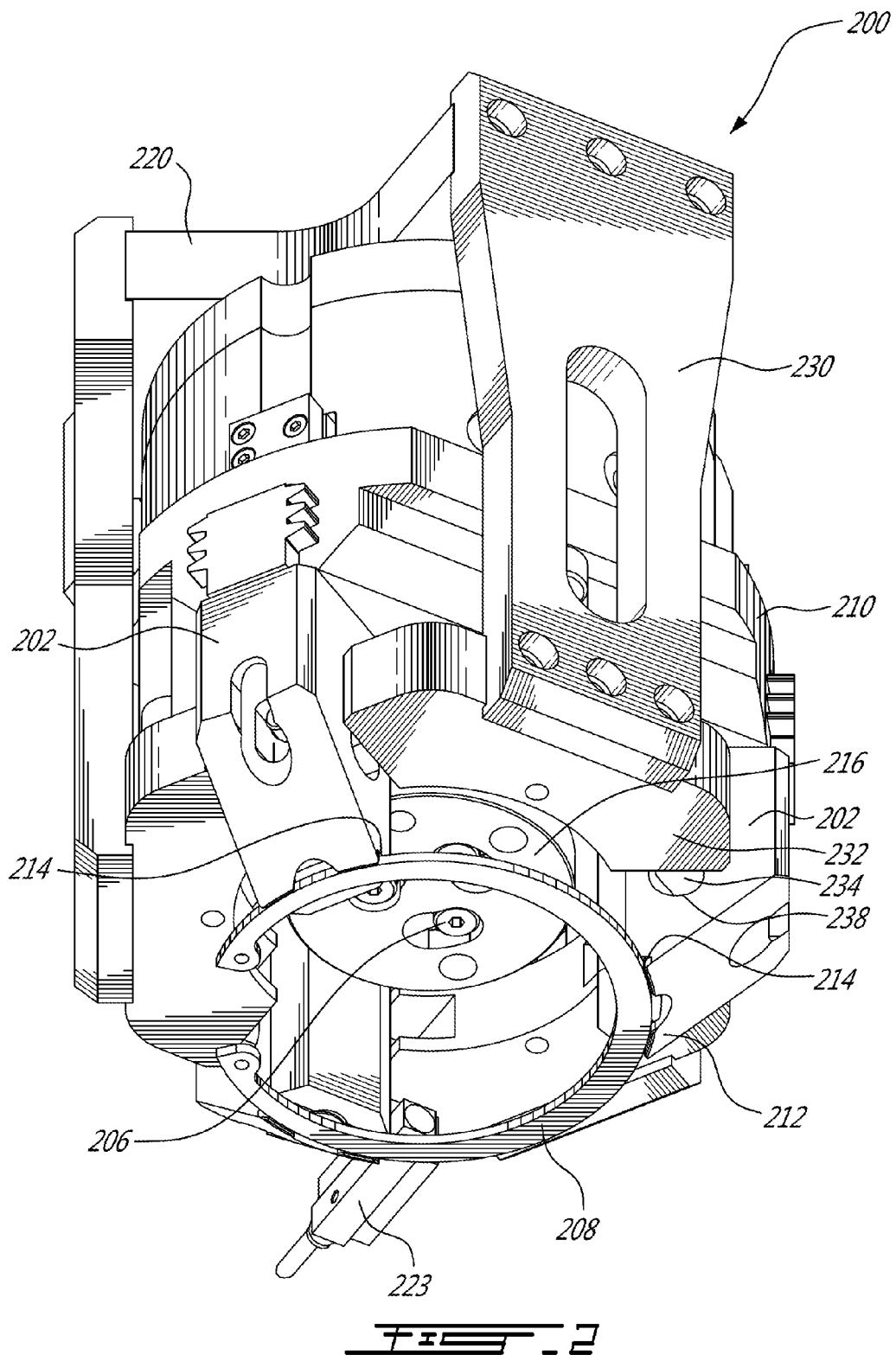
FIG. 2 is a perspective view of a resilient ring-shaped clip handling apparatus of the system of FIG. 1, in which the clip is being retained uncompressed by a set of radially operable fingers.
Figure 3:
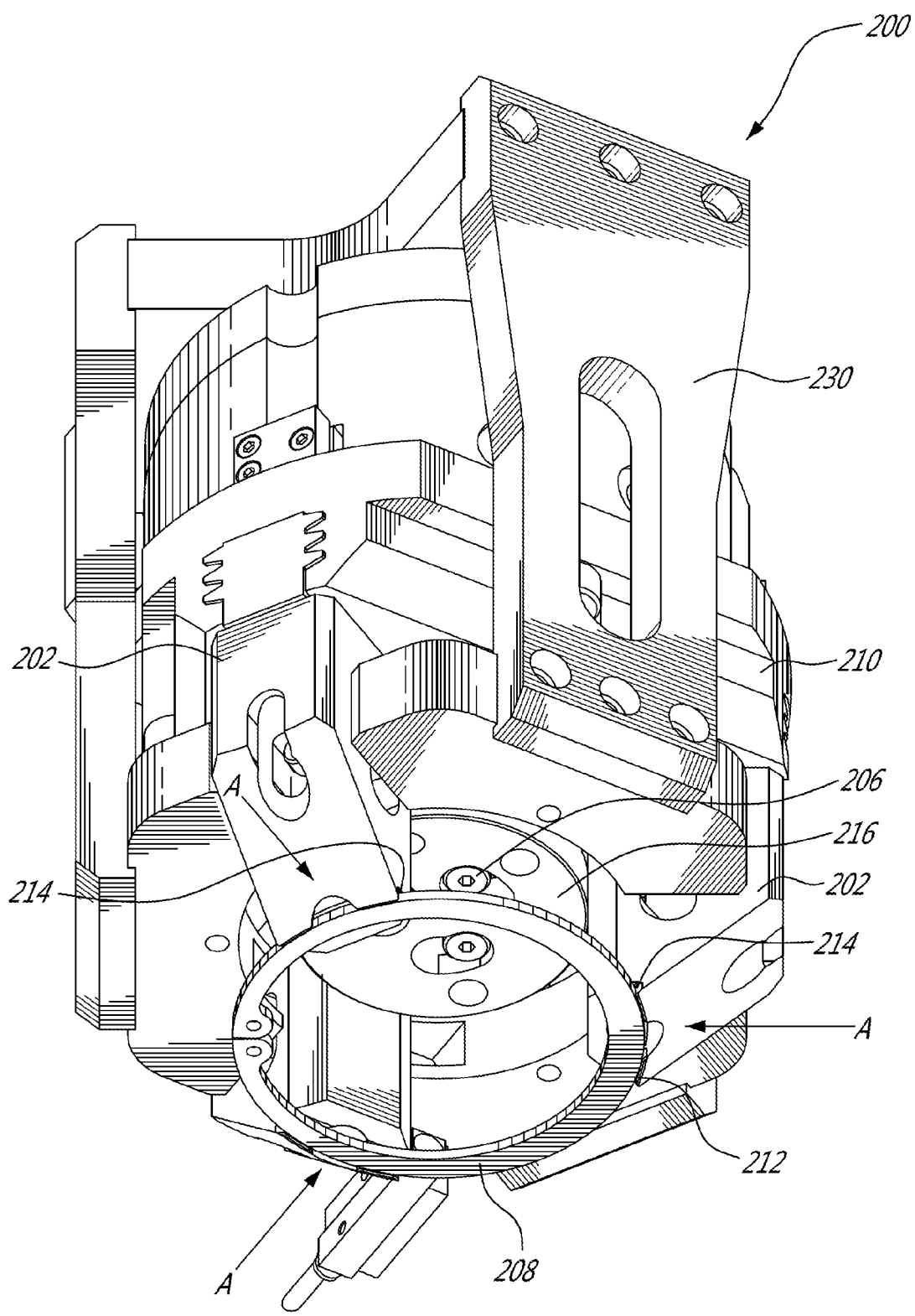
FIG. 3 is a perspective view of the resilient ring-shaped clip handling apparatus of FIG. 2, in which the clip is being compressed by the radially operable fingers for installation.
Figure 6:
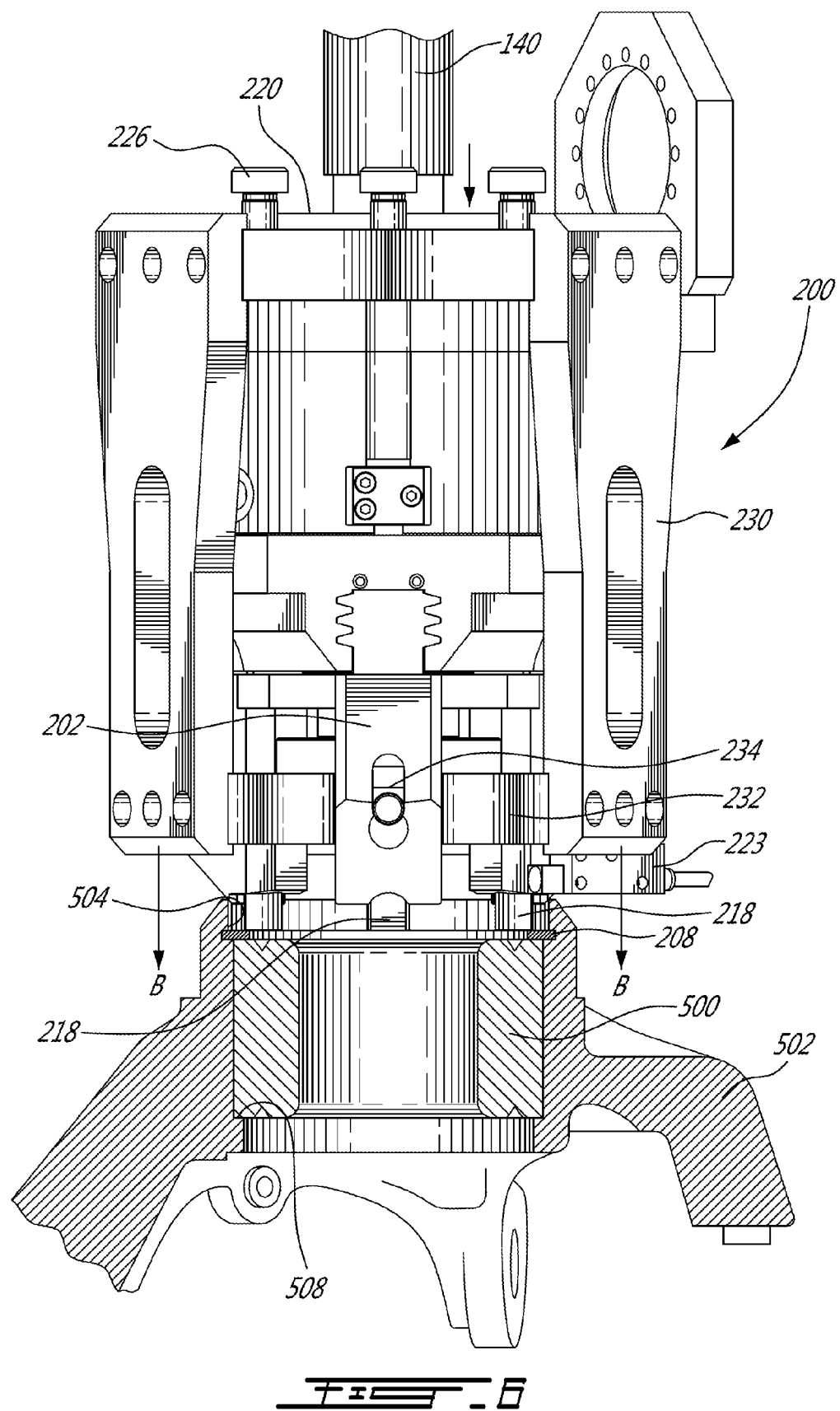
FIG. 6 is a side view of the resilient ring-shaped clip handling apparatus of FIG. 5, showing an axial stripping action applied to the ring from the press cylinder during installation thereof within the wheel bearing assembly.

With reference to FIGS. 2 and 3, the jig 200 generally comprises a set of three radially displaceable fingers 202 circumferentially disposed to extend axially from a jig body 210, in this embodiment consisting of a 3 jaw pneumatic gripper such as that provided by Schunk™. The fingers 202, which in this embodiment are custom-shaped and secured to the commercial gripper, terminate in respective clip handling tips 212 each having a clip-receiving feature defined therein, such as arcuate indentation or recessed arcuate seat 214, to receive and cooperatively hold the clip 208 between the set of fingers 202. In this particular example, the fingers 202 consist of pneumatically actuated fingers 202 operable to radially advance (arrows A of FIG. 3) and thereby radially compress the clip 208 (i.e. see compressed clip of FIG. 3) until a designated clip diameter setting is reached. In this example, this setting is at least partially prescribed by a diameter of a wheel bearing assembly bore into which the clip 208 is to be ultimately inserted and installed. For example, as best illustrated in FIGS. 5 and 6, the clip 208 is compressed such that a diameter thereof is slightly smaller than a diameter of wheel bearing bore 504. In this particular example, the pointed shape of the fingertips 214 allows for these fingers to penetrate the bore 504 in positioning the compressed clip 208 in alignment therewith. As introduced above, the radial travel of the fingers 202 is limited by a selectable disc stopper 216 centrally secured between the fingers 202 via bolt heads 206 so to abut against and thus restrict an inward movement of the fingers 202 to a designated clip compression setting.

Figure 4:
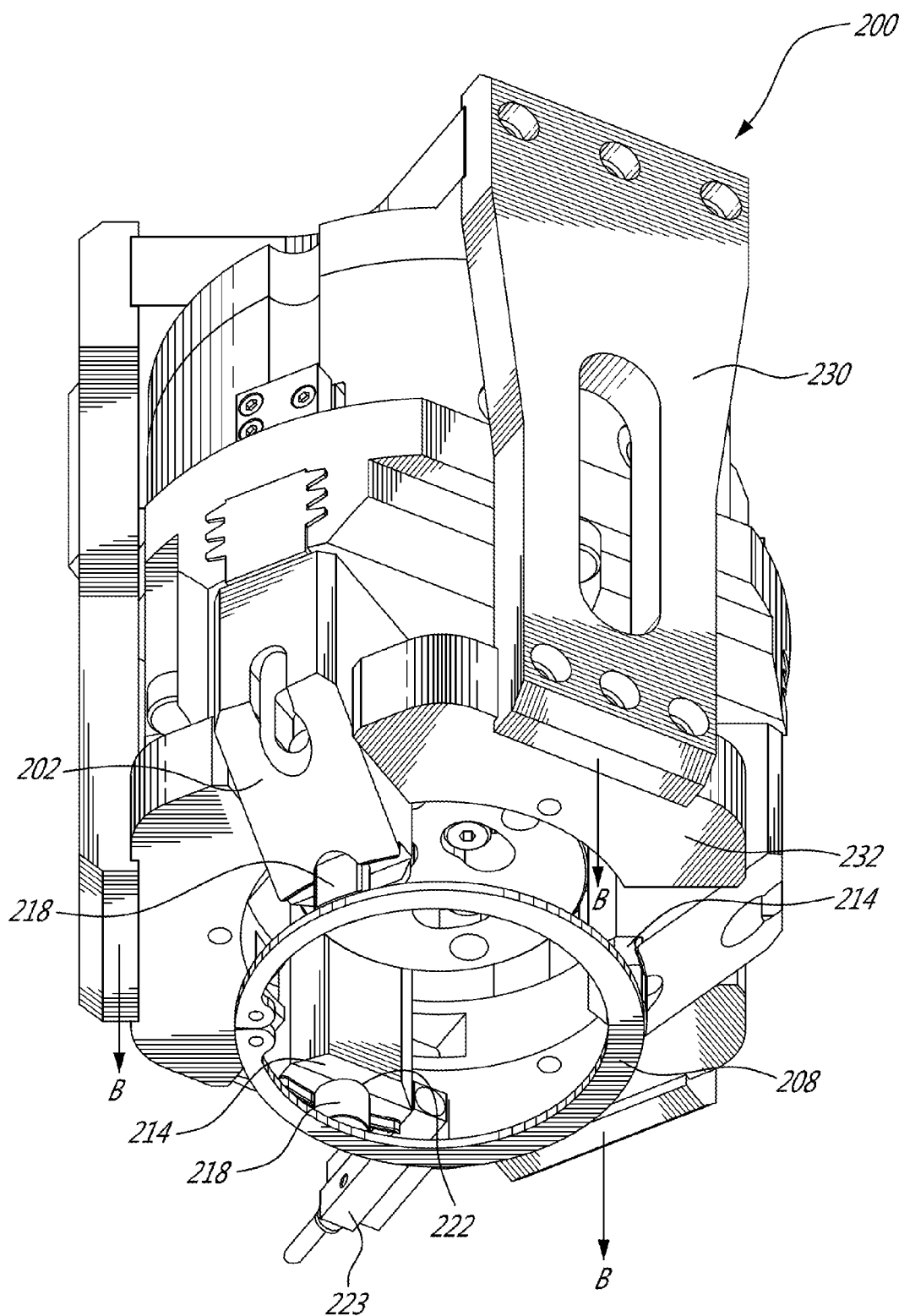
FIG. 4 is a perspective view of the resilient ring-shaped clip handling apparatus of FIG. 3, in which the compressed clip is being stripped from the radially operable fingers by axially operable stripping rods during installation.

With reference to FIGS. 4, 5 and 6, once the compressed clip is in position relative to the bore in which it is to be installed (e.g. bore 504 formed in wheel hub 502 of FIGS. 5 and 6), stripping rods 218 nested within the fingers 202 are mechanically activated by axial action from external press 140 on jig base plate 220 to axially extend (arrows B) and protrude from respective finger apertures 222 (see FIG. 9) defined within indentations 214. The stripping rods 218 thus contact and mechanically strip the compressed clip 208 from the indentations 214 and axially displace the compressed clip 208 for insertion within the bore 504 until it reaches an annular groove 506, where it expands and locks into place. Once in position, the released clip 208 serves to axially secure the bearing 500 between bore seat 508 and the clip 208 and thus impede the bearing 500 from exiting the bore 504.

In one embodiment, a proximity sensor 223 is also provided to track the clip 208 in the jig 200, for instance to ensure the clip 208 is not dropped during travel, and similarly, that it is discharged at the end of the installation process.

Figure 7:
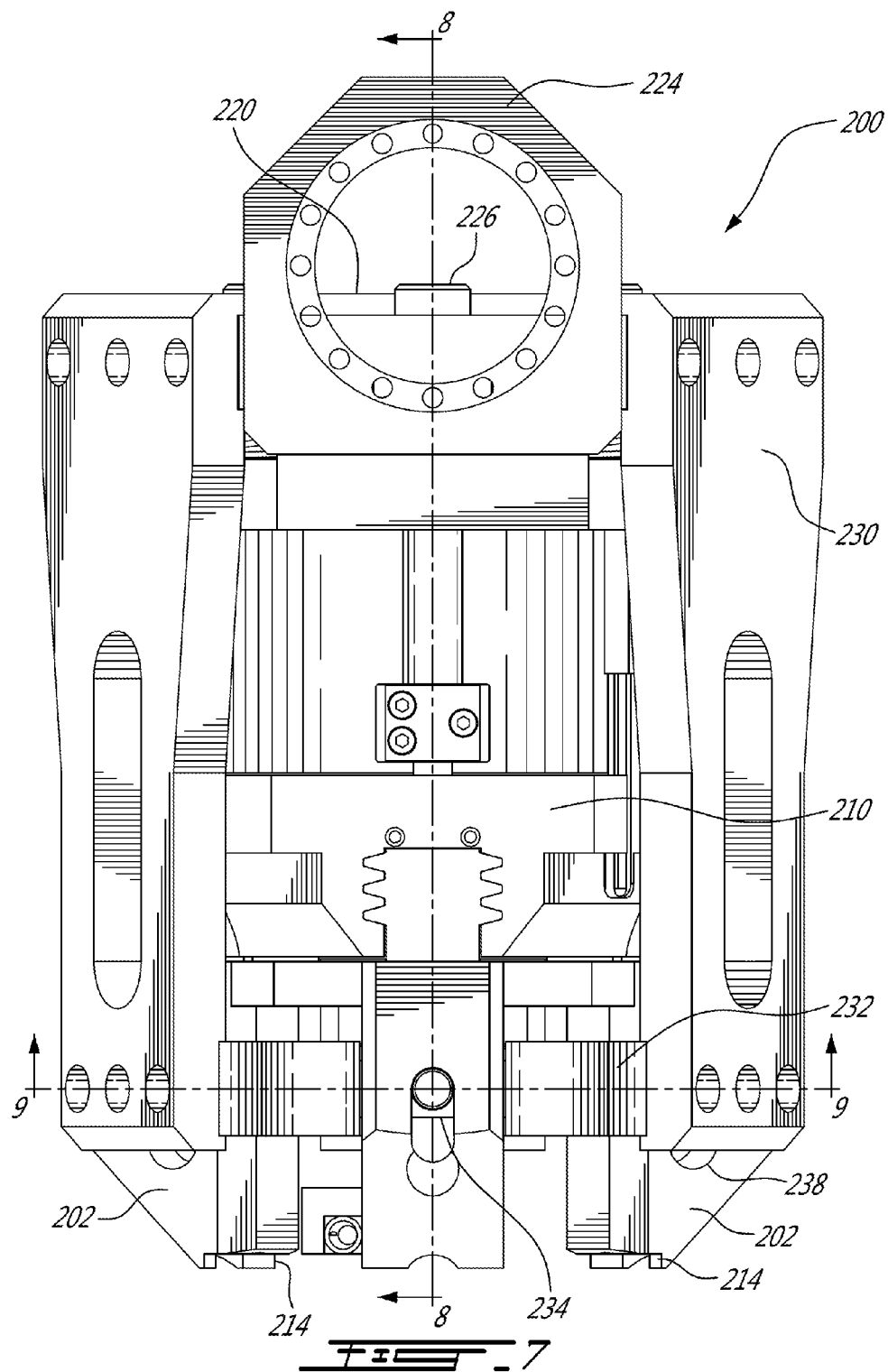
FIG. 7 is a side view of the resilient ring-shaped clip handling apparatus of FIG. 2.
Figure 9:
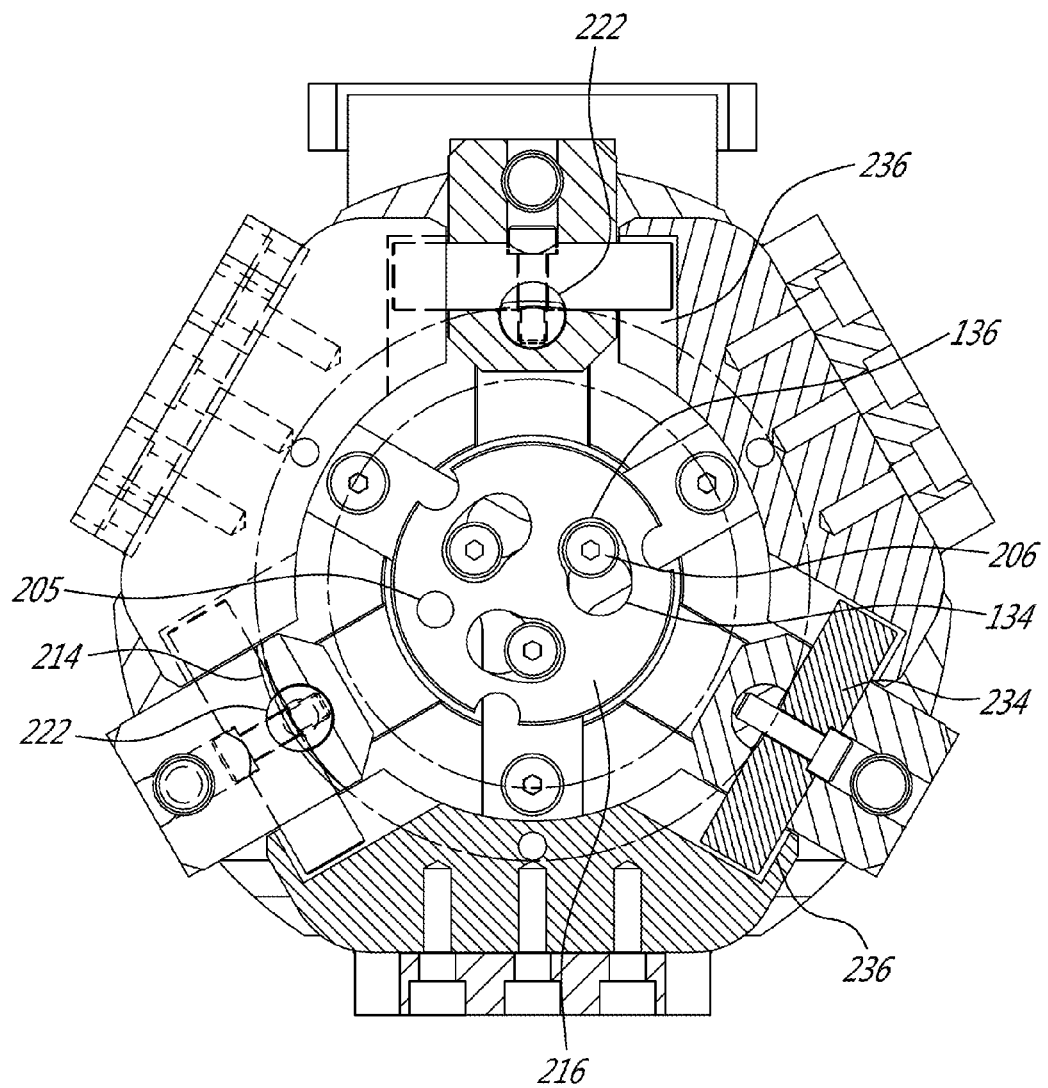
FIG. 9 is a partial horizontal cross sectional view of the resilient ring-shaped clip handling apparatus of FIG. 7 taken along line 9-9 thereof.

With particular reference now to FIGS. 7 to 9, an assembly and mechanical operation of the jig 200 will now be described in greater detail. In this embodiment, and as introduced above, the jig 200 provides both for a radial gripping action imparted via a set of three sliding fingers 202, and a stripping action imparted via a series of stripping rods 218 nested within these sliding fingers and activated by an axial action on the base 220 of the jig 200 by an external press cylinder 140. As noted above, the gripping action is provided, in part, by a pneumatic three jaw gripper, such as that manufactured by Schunk™, to which are secured the radially advancing and retracting fingers 202. Fixedly coupled to the jig body 210 is a robotic arm coupler 224 for fixedly coupling the jig body 210 to an articulated extremity of the robot 144 (see FIG. 1), which not only moves the handling jig 200 from station to station, but also powers and operates the jig 200 during use (i.e. via appropriate wiring, hydraulics and/or pneumatics).

To provide the stripping action, a stripping assembly is resiliently coupled to the jig body 210 via spring-loaded shoulder bolts 226. Namely, shoulder bolts 226 are secured through base plate 220, which forms part of the stripping assembly, such that the base plate 220, and thus the remainder of the stripping assembly directly or indirectly coupled thereto, resiliently hovers over a base portion 228 of the jig body 210. Three axial arms 230 are fixedly coupled at a periphery of the base plate 220 to axially extend along the jig body 210 and terminate into respective arcuate plates 232 that extend circumferentially between the fingers 202. Respective horizontal couplers 234 slidingly engage radially oblong recesses 236 defined within opposed circumferential extremities of adjacent plates 232, as each coupler 234 extends through a respective axially oblong channel 238 defined within each finger 202. Fixedly coupled to these couplers 234 are the stripping rods 218, which extend axially within each finger 202 and ultimately provide a stripping action through fingertip apertures 222.

Accordingly, the sliding coupling between horizontal couplers 234 and oblong plate recesses 236 allows the stripping rods 218 to travel along and within the fingers 202 as they contract or expand radially, while the sliding coupling between the horizontal couplers 234 and the oblong finger channels 238 allows the stripping rods 218 to extend axially from within the fingers 202 in applying a stripping action to the clip 208 retained within arcuate fingertip indentations 214. Therefore, upon applying an axial pressure against the spring-biased base plate 220, a corresponding axial displacement is applied to the axial arms 230 and associated plates 232, and thus to the stripping rods 218 via horizontal couplers 234.

According to the illustrated embodiment, while both gripping and stripping assemblies are integrated within a same handling apparatus 200, the stripping mechanism within the apparatus 200 is effectively independent (i.e. structurally isolated) from the gripping mechanism which allows the retaining ring 208 to be pressed into position without transferring any press loads to the robot 140. In some aspects, this permits the use of a relatively small robot (e.g. 20 Kg payload) to be used for this process.

While the present disclosure describes various exemplary embodiments, the disclosure is not so limited. To the contrary, the disclosure is intended to cover various modifications and equivalent arrangements included within the general scope of the present disclosure.

What is claimed is:

1. An apparatus for delivering a resilient ring-shaped clip to a clip receiving groove circumferentially defined within a bore, the apparatus comprising:
    three or more circumferentially spaced gripping fingers equidistant from one another and simultaneously radially movable to circumferentially grip and radially compress the clip for alignment with the bore; and
    two or more stripping rods operable to axially extend from the apparatus in alignment with the clip when compressed and apply an axial stripping force thereto that strips the compressed clip from said fingers and delivers the clip into the bore to rest within the groove.

2. The apparatus of claim 1, further comprising a selectable stopper disposable between said fingers so to limit a radial travel thereof and thus define a maximum clip compression designated in accordance with a bore dimension.

3. The apparatus of claim 2, wherein said selectable stopper comprises a disc-shaped stopper selectively coupleable between said fingers to simultaneously abut against an internal surface thereof upon reaching said maximum compression.

4. The apparatus of claim 1, wherein each of said two or more stripping rods is at least partially nested within a corresponding one of said fingers and operable to slidingly extend therefrom to axially engage and ultimately strip the compressed clip therefrom.

5. The apparatus of claim 4, wherein each of said fingers comprises a clip receiving feature defined at a tip thereof to facilitate clip gripping and compression; and wherein each of said rods extends through said clip receiving feature to axially engage the compressed clip.

6. The apparatus of claim 5, wherein said clip receiving feature comprises an arcuate indentation or recessed seat, and wherein each of said rods extends through said indentation or seat to axially engage the compressed clip.

7. The apparatus of claim 4, wherein the apparatus further comprises a load receiving structure that is structurally coupled to said stripping rods, such that an axial load applied to said structure applies an axial stripping force to the compressed clip through said rods.

8. The apparatus of claim 7, wherein the apparatus further comprises a body to which said fingers are operatively coupled, and wherein said load receiving structure is resiliently coupled to said body via one or more biased couplers such that a relative displacement between said body and said structure under action from said axial load is automatically reversed upon release of said load.

9. The apparatus of claim 7, wherein said axial load is applied via an external press.

10. A clip delivery method for delivering a resilient ring-shaped clip to a clip receiving groove circumferentially defined within a bore, the method comprising:
  circumferentially gripping the clip via two or more gripping fingers;
  radially compressing the clip via said two or more gripping fingers for alignment with the bore; and
  applying an axial stripping force on the radially compressed clip via stripping rods at least partially nested within said fingers so to extend therefrom and thus axially engage the clip under said axial stripping force, said stripping rods delivering the compressed clip into the bore under said axial stripping force to release within the groove.

11. The method of claim 10, wherein said applying step comprises externally applying said axial force.

12. The method of claim 10, further comprising the step prior to said gripping step of automatically designating a clip compression limit as a function of a bore dimension; wherein said radially compressing step comprises radially compressing the clip via said two or more gripping fingers to said clip compression limit for alignment with said bore dimensions.

13. The method of claim 12, wherein said designating step comprises automatically selecting and coupling a stopper between said fingers to limit a radial travel thereof and thus designate said clip compression limit.

14. A circlip handling apparatus comprising:
  gripping fingers circumferentially disposed and radially actuated to grip and radially compress the circlip; and
  stripping rods axially actuated to axially engage and strip the compressed circlip from said gripping fingers, wherein each of said stripping rods is at least partially nested within a corresponding one of said fingers to slidingly extend therefrom.

15. The apparatus of claim 14, further comprising a selectable stopper disposable between said fingers to limit a radial travel thereof to a designated clip compression setting.

16. The apparatus of claim 14, wherein each of said fingers comprises a clip receiving feature defined at a tip thereof; and wherein each of said rods extends through said clip receiving feature to axially engage the compressed clip.

17. The apparatus of claim 14, wherein the apparatus further comprises a load receiving structure structurally coupled to said stripping rods such that an axial load applied to said structure applies an axial stripping force to the compressed clip through said rods.

18. The apparatus of claim 17, wherein the apparatus further comprises a body to which said fingers are operatively coupled, and wherein said load receiving structure is resiliently coupled to said body via one or more biased couplers such that a relative displacement between said body and said structure under action from said axial load is automatically reversed upon release of said load.

\* \* \* \* \*